March 5, 1929.　　B. J. GOLDSMITH ET AL　　1,704,041
VEHICLE BODY
Filed Jan. 12, 1925
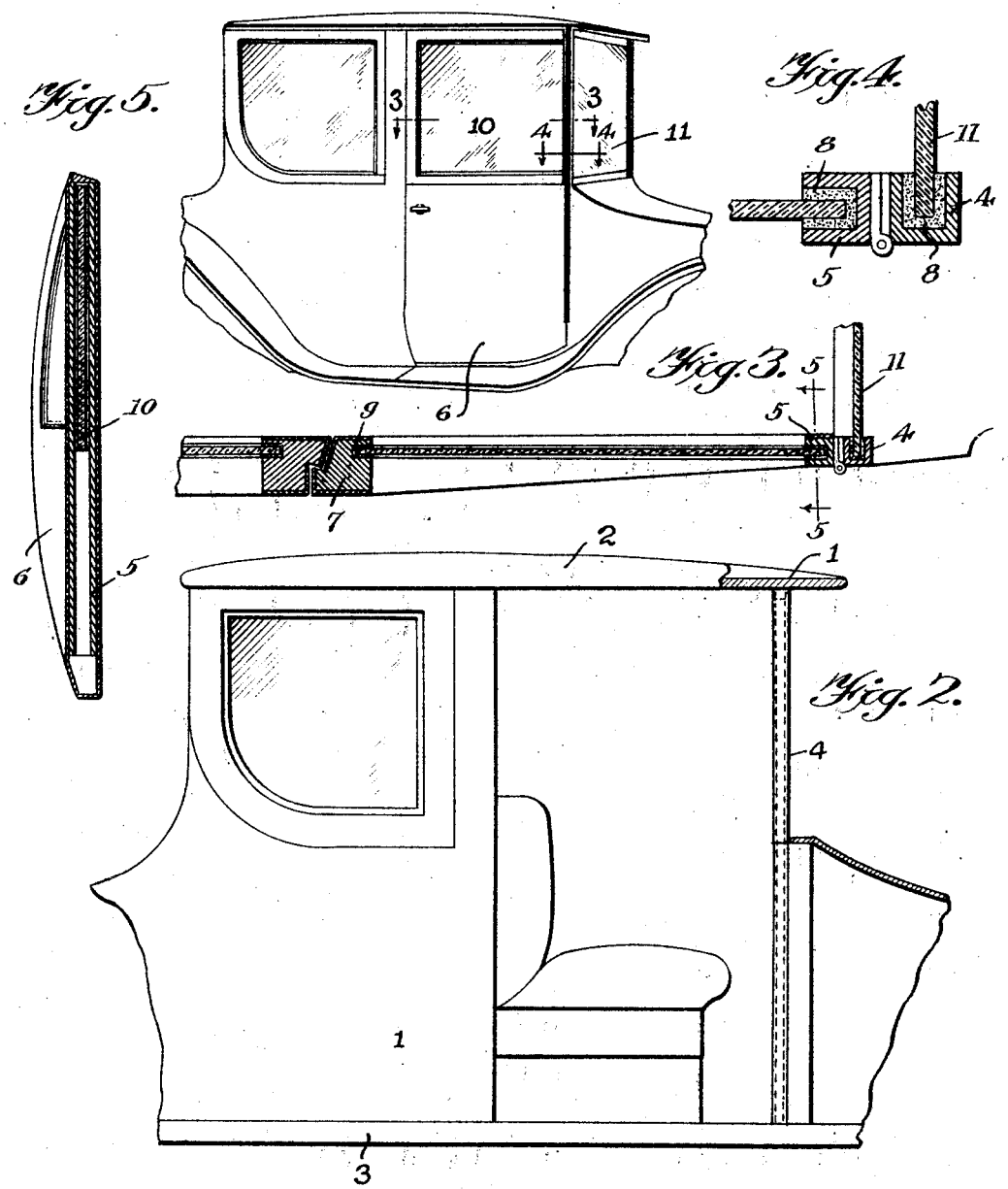
INVENTORS
Bertram J. Goldsmith.
Emil Koeb.
BY
Townsend & Decker
ATTORNEYS.

Patented Mar. 5, 1929.

1,704,041

UNITED STATES PATENT OFFICE.

BERTRAM J. GOLDSMITH, OF NEW YORK, AND EMIL KOEB, OF TUCKAHOE, NEW YORK, ASSIGNORS, BY MESNE ASSIGNMENTS, TO THE ENGLISH & MERSICK COMPANY, OF NEW HAVEN, CONNECTICUT, A CORPORATION OF CONNECTICUT.

VEHICLE BODY.

Application filed January 12, 1925. Serial No. 1,751.

Our invention relates to vehicle bodies such as the bodies of closed automobiles and has for its principal object the production of a body of simple construction which shall be so constructed as to permit the driver or operator within the vehicle to have a much clearer view before him and to his side than in other constructions of which we have knowledge.

Briefly stated our invention consists in forming the forward pillars or posts of the vehicle which connect the top to the floor or base of piano hinge members, one leg of the hinge forming a side of the windshield frame while the other leg forms a side of a door frame. We prefer also to so construct the legs of the hinge of U-members or channels in one of which the window pane or sash of the door is slidable while the other forms a guide or support for the windshield which may or may not be slidable therein. We thus provide the forward corners of the vehicle with connecting and supporting members of small thickness forming only a slight obstruction to the line of vision of the driver.

Other and further objects of the invention will appear from the accompanying description, the invention consisting in the novel vehicle body and parts hereinafter more particularly described and then specified in the claims.

In the accompanying drawings showing a practical embodiment of the invention:

Fig. 1 is a front elevation of a portion of a body of a closed automobile.

Fig. 2 is a similar enlarged view (partly in section) showing a door removed.

Fig. 3 is an enlarged horizontal section on the line 3—3 of Fig. 1.

Fig. 4 is an enlarged horizontal section on the line 4—4 of Fig. 1.

Fig. 5 is a vertical cross-section on the line 5—5 of Fig. 3.

Referring in detail to the several figures of the drawings:

1 indicates the main body portion of the vehicle, 2 the upper wall and 3 the floor or base thereof. The forward corner posts of the vehicle each comprise a piano hinge one leg 4 of which is preferably fastened to the upper wall 2 and to the frame adjacent the floor or base 3 while the other leg 5 comprises one of the side members of a door 6, the other vertical side member of said door being indicated at 7. The legs 4 as well as the legs 5 are U-shaped to form channels each receiving a similarly shaped lining 8 of compressible material such as felt. The side member 7 of the door is also provided with a U-shaped felt-lined channel 9, said channels 9 and 5 receiving a window pane or sash 10 which is vertically slidable therein and which may be actuated by any suitable means forming no part of our invention. The forward felt-lined channels 4 receive a window pane 11 comprising the windshield which may be or may not be slidable therein.

What we claim as our invention is:—

1. In a vehicle body, an upper and lower wall, a front door adjacent the driver of the vehicle and associated with said walls and provided with vertical side members one of which is provided with a lined channel therein, a piano hinge having two U-shaped lined legs, a window slidable in said channel and one of said legs and a windshield supported in the other of said legs.

2. In a vehicle body, the combination with the windshield, front door, and sliding front-door glass thereof; of a front corner-post extending between the base and roof of the said body for supporting the latter and formed with an inwardly-facing U-shaped channel for the reception and guidance of the said windshield; and a rearwardly-facing U-shaped channel-bar receiving and guiding the forward edge of the said sliding door-glass and directly hinged to the said front corner-post and forming the front vertical member of the said door.

Signed at New York in the county of New York and State of New York this 10th day of January, A. D. 1925.

EMIL KOEB.
BERTRAM J. GOLDSMITH.